United States Patent
Adachi et al.

(10) Patent No.: US 11,943,404 B2
(45) Date of Patent: Mar. 26, 2024

(54) IMAGE FORMING APPARATUS HAVING MOVABLE EXTERIOR PORTION ON WHICH DOCUMENT IS PLACED ON

(71) Applicant: FUJIFILM Business Innovation Corp., Tokyo (JP)

(72) Inventors: Isamu Adachi, Kanagawa (JP); Tomonori Sato, Kanagawa (JP); Ryusuke Nakata, Kanagawa (JP); Kazuyuki Koda, Kanagawa (JP); Miho Morita, Kanagawa (JP); Tomomi Ishida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 186 days.

(21) Appl. No.: 17/569,468

(22) Filed: Jan. 5, 2022

(65) Prior Publication Data
US 2023/0054658 A1    Feb. 23, 2023

(30) Foreign Application Priority Data

Aug. 23, 2021    (JP) .................................. 2021-135488

(51) Int. Cl.
H04N 1/00        (2006.01)
G03G 15/00       (2006.01)
H04N 1/195       (2006.01)

(52) U.S. Cl.
CPC ....... *H04N 1/00557* (2013.01); *G03G 15/605* (2013.01); *G03G 15/6529* (2013.01);
(Continued)

(58) Field of Classification Search
None
See application file for complete search history.

(56) References Cited

U.S. PATENT DOCUMENTS 4,908,520 A * 3/1990 Saotome ............... G01T 1/2012
                                                    250/589
5,614,991 A * 3/1997 Moro ................... G03G 15/605
                                                     355/75
(Continued)

FOREIGN PATENT DOCUMENTS

JP     2017175594 A  *  9/2017
JP     2021068980       4/2021
WO  WO-2008057746 A2 *  5/2008  ........... G03G 15/605

OTHER PUBLICATIONS

Translation into English of JP-2017175594-A.*

*Primary Examiner* — Arlene Heredia
(74) *Attorney, Agent, or Firm* — JCIPRNET

(57) ABSTRACT

An image forming apparatus includes: an image forming section that forms an image on a document; a first ejection section that ejects the document on which the image has been formed; an exterior portion which is movable and a part of which constitutes an exterior of the apparatus; an entrance portion that is exposed by movement of the exterior portion and that constitutes an entrance for the document to be transported to an image reading section that reads the image formed on the document; the image reading section that reads the image formed on the document transported after the entrance portion is exposed; and a second ejection section that ejects the document which has been read by the image reading section. An ejecting direction of the first ejection section, an ejecting direction of the second ejection section, and a moving direction of the exterior portion coincide with each other.

20 Claims, 8 Drawing Sheets

(52) U.S. Cl.
CPC ..... *H04N 1/00559* (2013.01); *H04N 1/00602* (2013.01); *H04N 1/00631* (2013.01); *H04N 1/19594* (2013.01)

(56)  References Cited

U.S. PATENT DOCUMENTS

| | | | |
|---|---|---|---|
| 7,552,922 B2 * | 6/2009 | Terada | H04N 1/00525 |
| | | | 399/125 |
| 2009/0174916 A1 * | 7/2009 | Ootsuka | H04N 1/00795 |
| | | | 358/498 |
| 2009/0206539 A1 * | 8/2009 | Takeuchi | B65H 31/02 |
| | | | 271/3.14 |
| 2017/0134598 A1 * | 5/2017 | Nagano | H04N 1/00795 |
| 2017/0180586 A1 * | 6/2017 | Ochiai | G10K 11/16 |
| 2021/0120137 A1 | 4/2021 | Okamoto et al. | |
| 2023/0053499 A1 * | 2/2023 | Ishikura | H04N 1/19594 |

* cited by examiner

IMAGE FORMING APPARATUS HAVING MOVABLE EXTERIOR PORTION ON WHICH DOCUMENT IS PLACED ON

CROSS-REFERENCE TO RELATED APPLICATIONS

This application is based on and claims priority under 35 USC 119 from Japanese Patent Application No. 2021-135488 filed Aug. 23, 2021.

BACKGROUND

(i) Technical Field

The present disclosure relates to an image forming apparatus.

(ii) Related Art

Japanese Unexamined Patent Application Publication No. 2021-68980 describes a document reading device that includes a document placement platen and an automatic document feeding device supported on the document placement platen so as to be turnable between a closed position to cover the upper surface of the document placement platen and an open position to open the upper surface of the document placement platen.

SUMMARY

In some image forming apparatuses, the ejecting direction of a document ejected through an image reading section that reads an image of the document being transported and the ejecting direction of a document ejected through an image forming section that forms an image on the document are the same as each other. If the ejecting direction of the document is different from the direction of an operation to expose an entrance portion that serves as an entrance for a document to be transported to the image reading section which reads an image formed on the document in the image forming apparatuses, a space is required in each of the two directions.

Aspects of non-limiting embodiments of the present disclosure relate to an image forming apparatus, in which the ejecting direction of a document ejected through an image reading section that reads an image of the document being transported and the ejecting direction of a document ejected through an image forming section that forms an image on the document are the same as each other, the image forming apparatus being capable of reducing a space required to perform an operation to expose an entrance portion that serves as an entrance for a document to be transported to the image reading section which reads an image formed on the document and an operation to take an ejected document, compared to when the direction of the operation to expose the entrance portion is different from the ejecting direction of the document.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: an image forming section that forms an image on a document; a first ejection section that ejects the document on which the image has been formed by the image forming section; an exterior portion which is movable and at least a part of which constitutes an exterior of the apparatus; an entrance portion that is exposed by movement of the exterior portion and that constitutes an entrance for the document to be transported to an image reading section that reads the image formed on the document; the image reading section that reads the image formed on the document transported after the entrance portion is exposed; and a second ejection section that ejects the document which has been read by the image reading section, in which an ejecting direction of the first ejection section, an ejecting direction of the second ejection section, and a moving direction of the exterior portion coincide with each other.

BRIEF DESCRIPTION OF THE DRAWINGS

An exemplary embodiment of the present disclosure will be described in detail based on the following figures, wherein.

DETAILED DESCRIPTION

Figure 1:
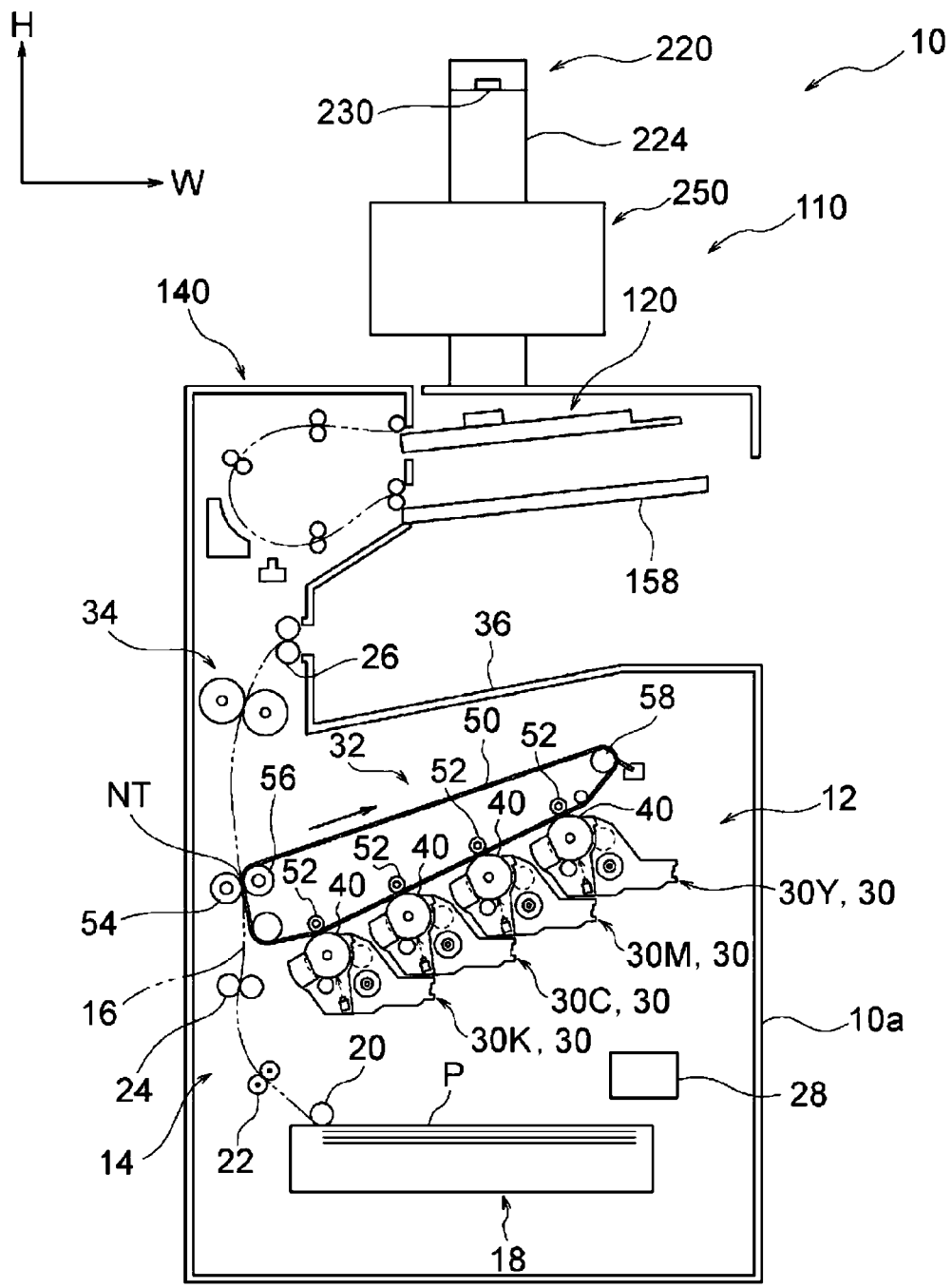
FIG. 1 illustrates a schematic configuration of an image forming apparatus according to an exemplary embodiment of the present disclosure.

An image forming apparatus according to an exemplary embodiment of the present disclosure will be described with reference to FIGS. 1 to 8. In the drawings, the arrow H indicates the vertical direction or the apparatus up-down direction, the arrow W indicates a horizontal direction corresponding to the apparatus width direction, and the arrow D indicates a horizontal direction corresponding to the apparatus depth direction.

(Overall Configuration of Image Forming Apparatus)

As illustrated in FIG. 1, an image forming apparatus 10 includes an image reading device 110 that reads an image formed on a document G, an image forming section 12 that forms toner images through electrophotography, and a transport section 14 that transports a recording medium P along a transport path 16. The image forming apparatus 10 also includes a storage member 18 that stores the recording medium P and a controller 28 that controls the entire apparatus.

In the image forming apparatus 10 configured as described above, the image formed on the document G is read by the image reading device 110. The recording medium P stored in the storage member 18 is transported along the transport path 16 by the transport section 14. The toner image formed by the image forming section 12 is formed on the recording medium P being transported. The recording medium P on which the toner image has been formed is ejected to the outside of an apparatus body 10a.

[Image Forming Section 12]

As illustrated in FIG. 1, the image forming section 12 includes a plurality of toner image forming sections 30 that form toner images in respective colors, and a transfer section 32 that transfers the toner images formed by the toner image forming sections 30 to the recording medium P. The image forming section 12 further includes a fixing device 34 that fixes the toner images, which have been transferred to the recording medium P by the transfer section 32, to the recording medium P.

—Toner Image Forming Sections 30—

A plurality of toner image forming sections 30 are provided to form toner images in respective colors. In the present exemplary embodiment, toner image forming sections 30 for four colors, namely yellow (Y), magenta (M), cyan (C), and black (K), are provided. In the following description, symbols Y, M, C, and K that accompany the reference numerals are omitted if it is not necessary to distinguish yellow (Y), magenta (M), cyan (C), and black (K).

Figure 2:
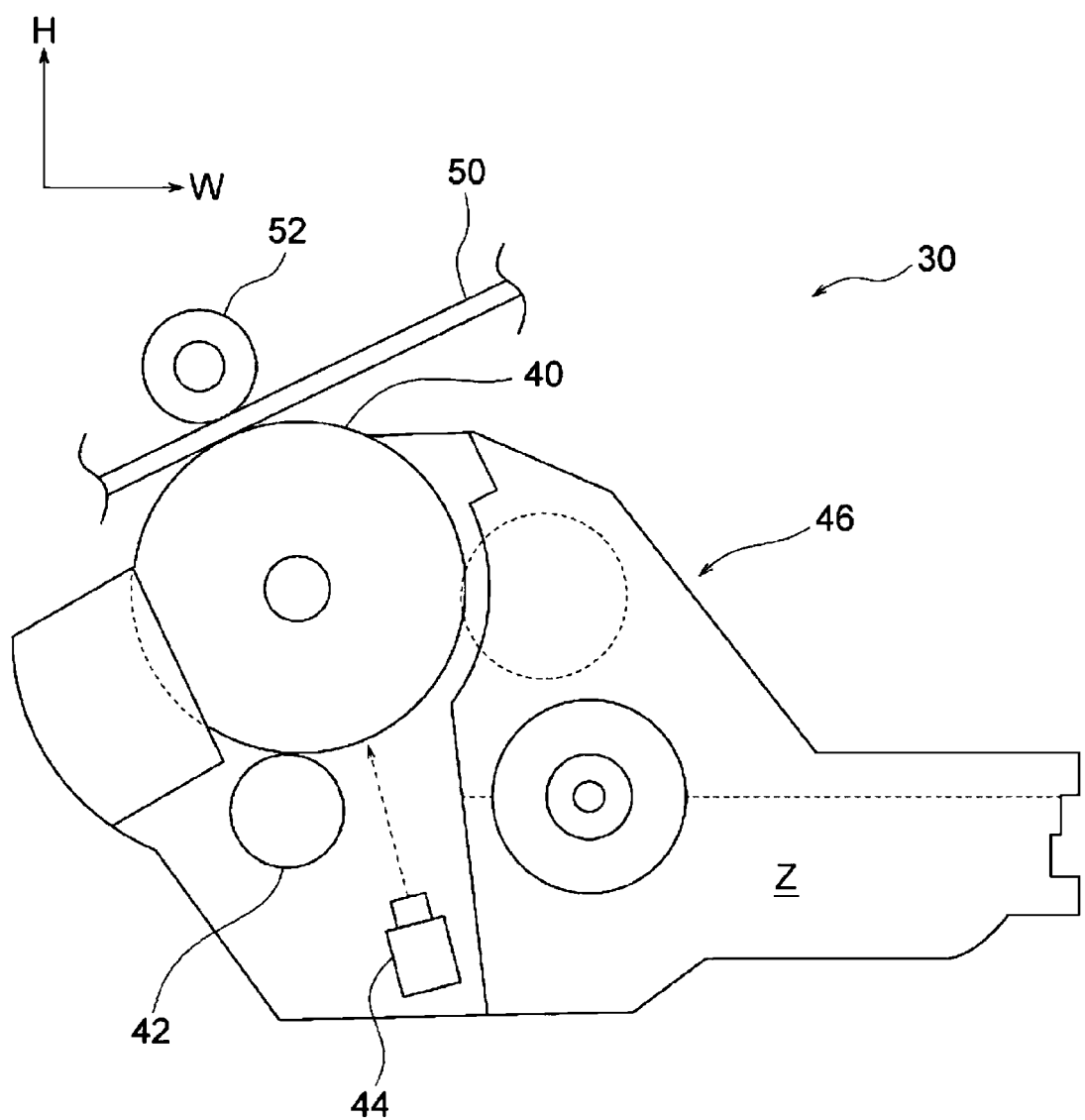
FIG. 2 illustrates the configuration of an image forming section of the image forming apparatus according to the exemplary embodiment of the present disclosure.

The toner image forming sections 30 for the respective colors are basically constituted in the same manner except for the toners to be used. As illustrated in FIG. 2, the toner image forming section 30 includes an image holding member 40 that is cylindrical and rotatable, and a charging unit 42 that charges the image holding member 40. The toner image forming section 30 further includes an exposure device 44 that radiates exposure light to the image holding member 40, which has been charged, to form an electrostatic latent image, and a developing device 46 that develops the electrostatic latent image as a toner image using a developer Z containing a toner. Consequently, the toner image forming section 30 for each color forms an image in each color using a toner in each color.

As illustrated in FIG. 1, the image holding member 40 for each color is in contact with a transfer belt 50 (to be discussed in detail later) that is circulated. The toner image forming sections 30 are disposed side by side in the order of yellow (Y), magenta (M), cyan (C), and black (K) from the upstream side in the circulation direction (see the arrow in the drawing) of the transfer belt 50.

—Transfer Section 32—

As illustrated in FIG. 1, the transfer section 32 includes the transfer belt 50 and first transfer rollers 52 disposed on the opposite side of the transfer belt 50 from the image holding members 40 for the respective colors to transfer the toner images formed by the image holding members 40 for the respective colors to the transfer belt 50.

The transfer section 32 also includes a winding roller 56 around which the transfer belt 50 is wound, and a drive roller 58 around which the transfer belt 50 is wound and which transfers a rotational force to the transfer belt 50. Consequently, the transfer belt 50 is circulated in the direction of the arrow in the drawing.

The transfer section 32 further includes a second transfer roller 54 disposed on the opposite side of the transfer belt 50 from the winding roller 56 to transfer the toner images, which have been transferred to the transfer belt 50, to the recording medium P. A transfer nip NT at which the toner images are transferred to the recording medium P is formed between the second transfer roller 54 and the transfer belt 50.

With this configuration, the toner images are transferred to the transfer belt 50 through a first transfer by the first transfer roller 52 in the order of yellow (Y), magenta (M), cyan (C), and black (K). The toner images are transferred from the transfer belt 50 to the recording medium P, which is transported as held between the transfer belt 50 and the second transfer roller 54, by the second transfer roller 54. The recording medium P, to which the toner images have been transferred, is transported toward the fixing device 34.

—Fixing Device 34—

As illustrated in FIG. 1, the fixing device 34 is disposed downstream of the transfer nip NT in the transport direction of the recording medium P. The fixing device 34 fixes the toner images, which have been transferred to the recording medium P, to the recording medium P through heating and pressurization.

[Transport Section 14]

As illustrated in FIG. 1, the transport section 14 includes a feed roller 20 that feeds the recording medium P stored in the storage member 18 to the transport path 16, and prevention rollers 22 that prevent a multiple feed of the recording medium P fed by the feed roller 20. The transport section 14 further includes adjustment rollers 24 that adjust the timing to feed the recording medium P to the transfer nip NT, and ejection rollers 26 that eject the recording medium P, to which the toner images have been fixed by the fixing device 34, to the outside of the apparatus body 10a.

Specifically, the ejection rollers 26 transport the recording medium P from one side (left side in the drawing) to the other side (right side in the drawing) in the apparatus width direction, and eject the recording medium P to an ejection section 36 formed in the apparatus body 10a. That is, the ejecting direction of the recording medium P, on which an image has been formed, is the direction of the other side in the apparatus width direction. The ejection section 36 is an example of the first ejection section.

[Image Reading Device 110]

As illustrated in FIG. 1, the image reading device 110 is disposed at the upper portion of the image forming apparatus 10. The image reading device 110 reads an image illustrated on the document G (see FIG. 4B). The image reading device 110 will be discussed in detail later.

[Others]

The image forming apparatus 10 is provided with a display 250 through which a user inputs an instruction to the image forming apparatus 10. The display 250 will be discussed in detail later.

(Construction of Principal Portion)

Next, the image reading device 110 and the display 250 will be described.

Figure 3A:
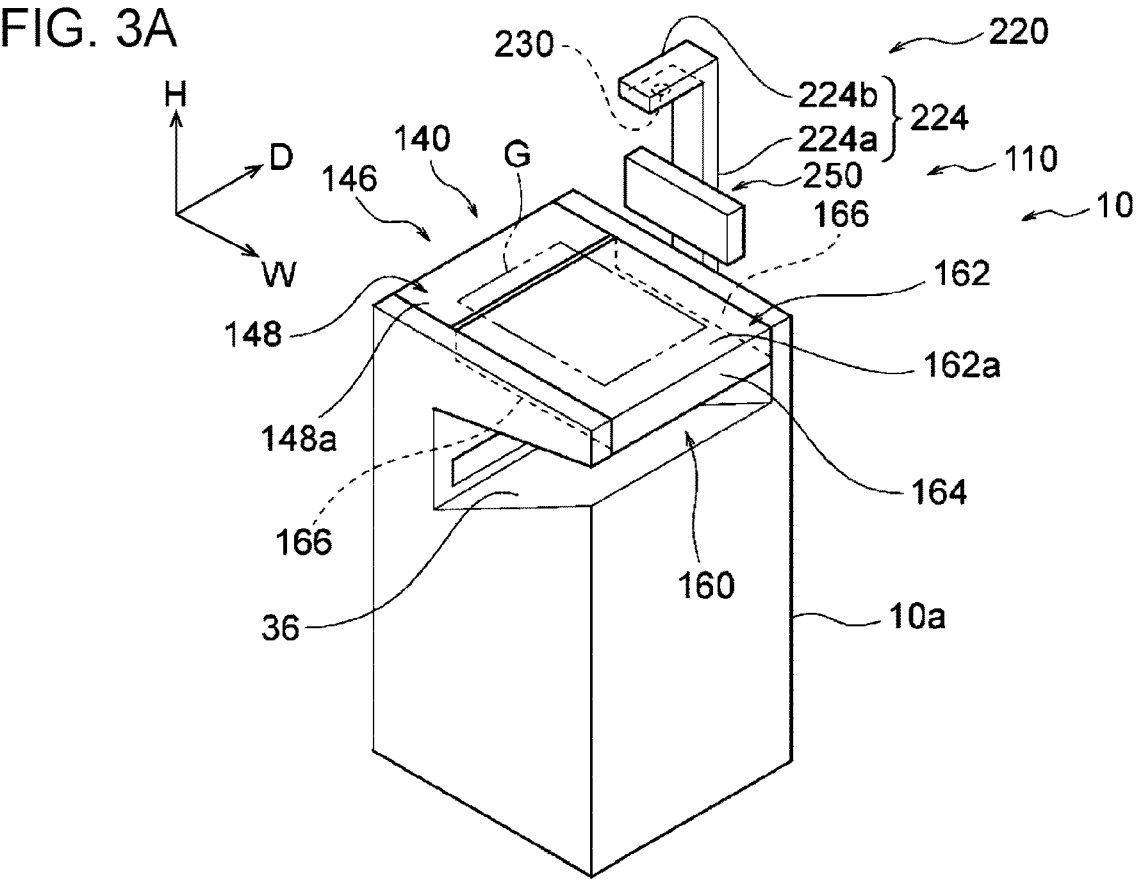
FIGS. 3A and 3B are each a perspective view illustrating the image forming apparatus according to the exemplary embodiment of the present disclosure.
Figure 3B:
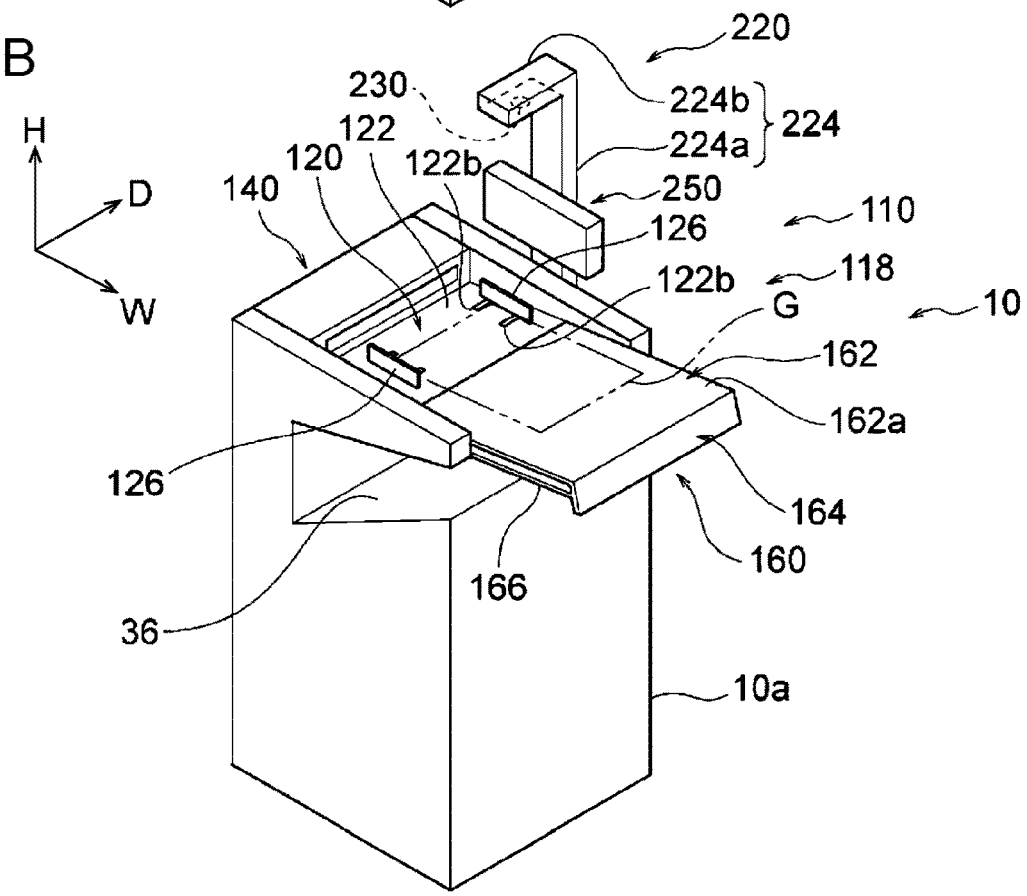
Figure 4A:
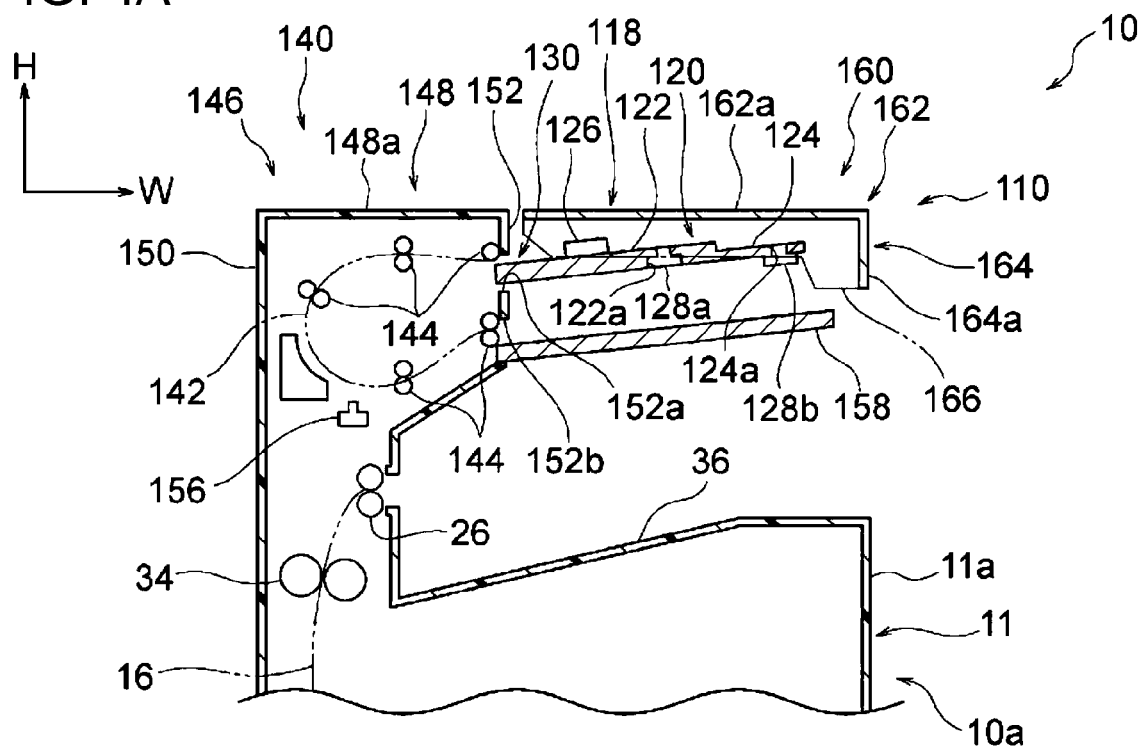
FIGS. 4A and 4B are each a sectional view illustrating an image reading device of the image forming apparatus according to the exemplary embodiment of the present disclosure.
Figure 4B:
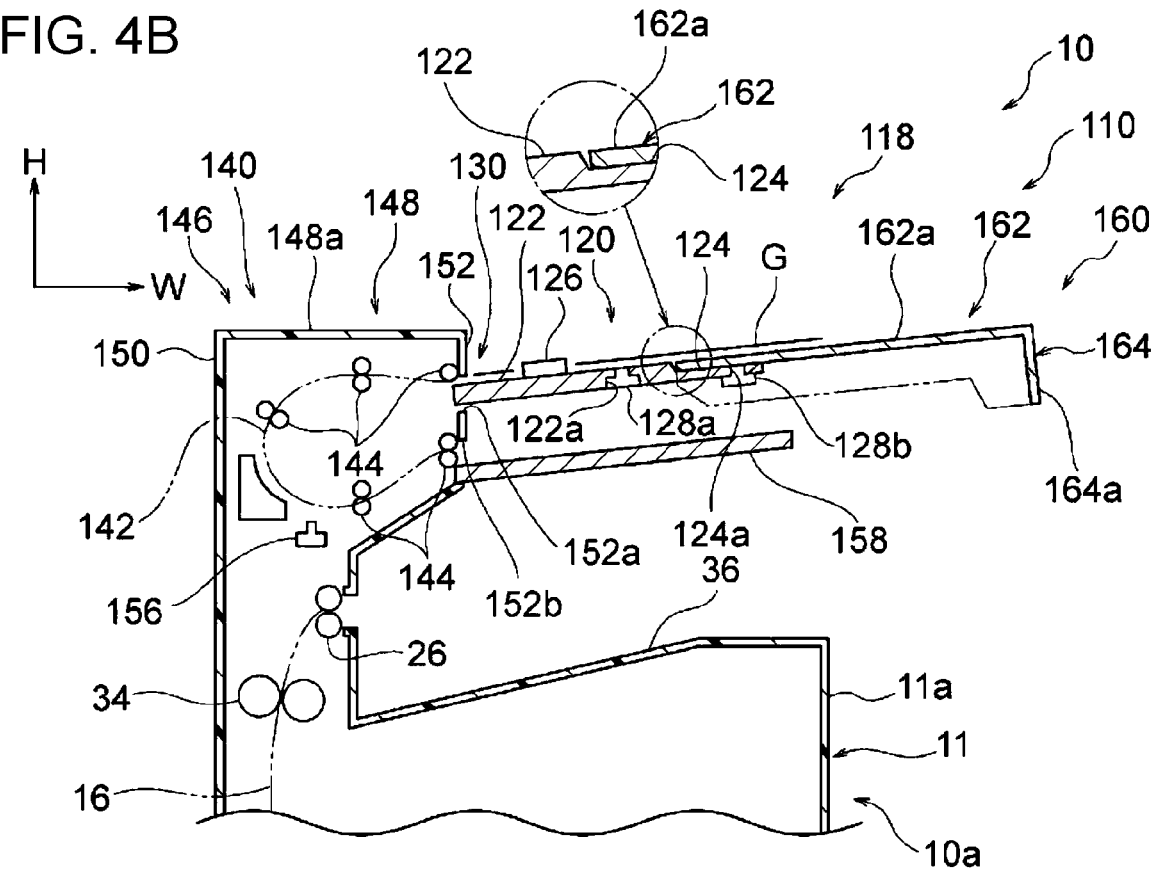

As illustrated in FIGS. 3A and 3B, the image reading device 110 is disposed at the upper portion of the image forming apparatus 10. As illustrated in FIGS. 4A and 4B, the image reading device 110 includes a loading unit 118 that includes a placement portion 120 for placement of the document G, and a transport section 140 disposed on one side (left side in the drawings) in the apparatus width direction with respect to the placement section 120 to transport the document G.

The image reading device 110 further includes a reading section 156 that reads an image on the document G transported by the transport section 140, and an ejection section 158 to which the document G is ejected after an image is read from the document G by the reading section 156. The image reading device 110 also includes an exterior portion 160 that blocks a field of view for a placement surface 122 of the placement portion 120, and guide portions 180 (see FIGS. 5A and 5B) that guide the exterior portion 160 to a blocking position (see FIGS. 3A and 4A) at which a field of view for the placement surface 122 is blocked and an exposure position (see FIGS. 3B and 4B) at which the placement surface 122 is exposed.

One or more documents G are placed on the placement surface 122 of the placement portion 120 with the exterior section 160 positioned at the exposure position.

As illustrated in FIG. 1, the image reading device 110 further includes an imaging unit 220 that reads an image of one stationary document G.

[Loading Unit 118]

As illustrated in FIGS. 4A and 4B, the loading unit 118 includes the placement portion 120, restriction portions 126 that restrict the position of the document G (see FIG. 4B) placed on the placement surface 122 formed on the placement portion 120, and detection portions 128 that detect the document G placed on the placement surface 122.

—Placement Portion 120—

The placement portion 120 is in a plate shape with the plate thickness direction corresponding to the apparatus up-down direction, and in a rectangular shape as seen from above. The placement portion 120 includes the placement surface 122 for placement of the document G and a recessed portion 124 disposed on the other side (right side in the drawings) in the apparatus width direction with respect to the placement surface 122 and recessed with respect to the placement surface 122. Specifically, the recessed portion 124 is recessed with respect to the placement surface 122 by the plate thickness of a top plate 162 of the exterior portion 160.

The placement surface 122 and the recessed portion 124 are formed to extend in the apparatus depth direction, and inclined with respect to the horizontal direction such that portions of the placement surface 122 and the recessed portion 124 on one side in the apparatus width direction are lower than portions thereof on the other side in the apparatus width direction as seen in the apparatus depth direction.

Figure 7A:
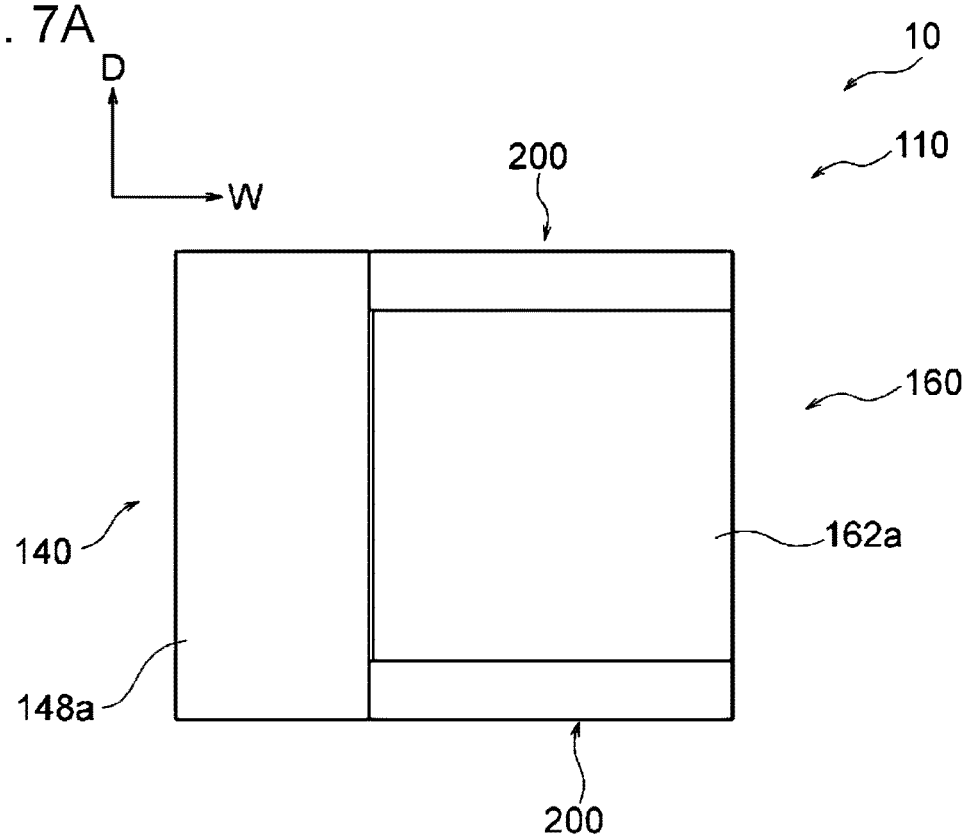
FIGS. 7A and 7B are each a plan view illustrating the image reading device of the image forming apparatus according to the exemplary embodiment of the present disclosure.
Figure 7B:
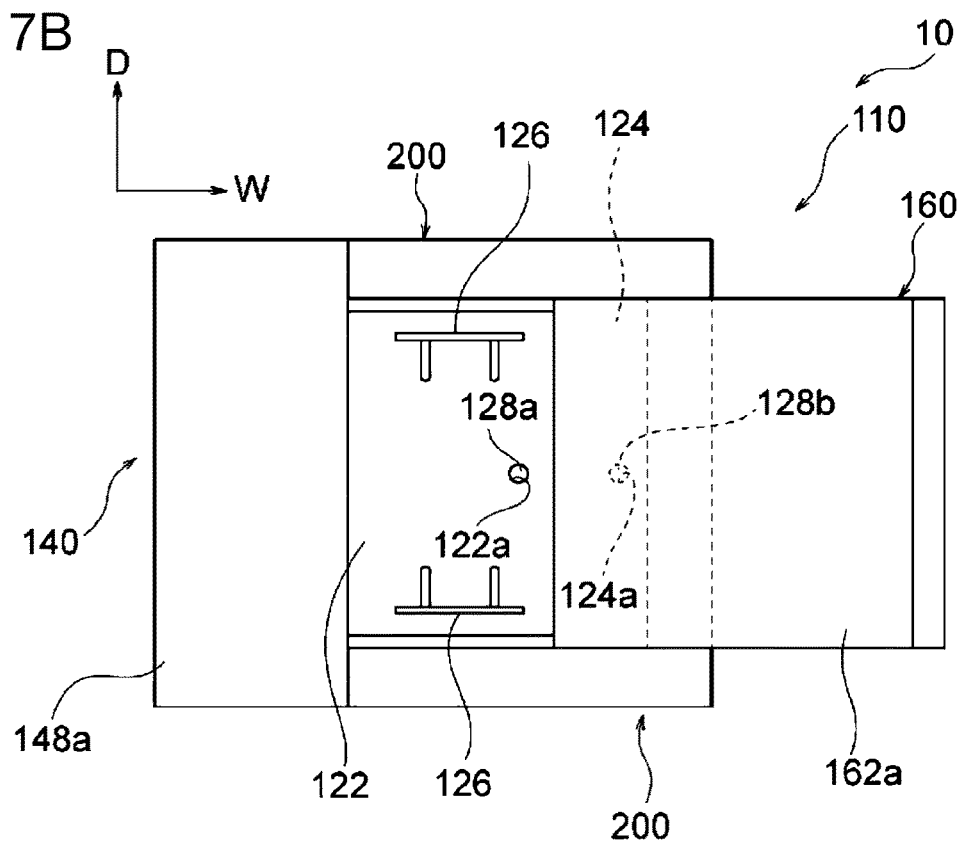

Through holes 122a and 124a are formed in the placement portion 120 to penetrate the placement portion 120 in the up-down direction. Specifically, as illustrated in FIG. 7B, the through hole 122a is formed at a portion of the placement surface 122 on the center side in the apparatus depth direction and on the other side in the apparatus width direction. The through hole 124a is formed at a portion of the recessed portion 124 on the center side in the apparatus depth direction and on the other side in the apparatus width direction.

—Restriction Portions 126—

As illustrated in FIG. 3B, a pair of restriction portions 126 are attached to the placement surface 122.

The pair of restriction portions 126 are spaced from each other in the apparatus depth direction, and symmetrical to each other in the apparatus depth direction. The restriction portions 126 are guided by a pair of slits 122b formed in the placement portion 120 to extend in the apparatus depth direction so as to be movable in a determined range in the apparatus depth direction. The restriction portions 126 which are movable are kept stationary by a friction force generated between the restriction portions 126 and the placement surface 122. The pair of restriction portions 126 restrict the position of the document G in the apparatus depth direction by contacting the side edges of the document G placed on the placement surface 122 which is exposed.

The loading unit 118 adopts center registration, and is provided with a mechanism (not illustrated) that moves, when one of the restriction portions 126 is moved in the apparatus depth direction, the other restriction portion 126 in the apparatus depth direction by the same amount.

With this configuration, a detection unit (not illustrated) detects the positions of the pair of restriction portions 126 as the restriction portions 126 contact the side edges of the document G. The controller 28 derives the length of the document G in the document width direction on the basis of a detection signal from the detection unit.

—Detection Portions 128—

The detection portions 128 are optical reflection sensors. As illustrated in FIGS. 4A and 4B, a pair of detection portions 128 are provided side by side in the apparatus width direction.

One of the detection portions 128 (hereinafter "detection portion 128a") is attached in the through hole 122a, and emits light upward to detect the document G placed on the placement surface 122. The other detection portion 128 (hereinafter "detection portion 128b") is attached in the through hole 124a, and emits light upward to detect the document G placed on a top surface 162a of the exterior portion 160.

With this configuration, when a detection unit (not illustrated) detects that the exterior portion 160 is positioned at the exposure position, the detection portions 128a and 128b radiate light to the document G placed on the placement surface 122.

The detection portions 128a and 128b may radiate light in other situations, rather than when the exterior portion 160 is positioned at the exposure position. For example, the detection portions 128a and 128b may radiate light at all times, or may radiate light in the case where it is detected that the image reading section 110 is to be used. Examples of the case where it is detected that the image reading section 110 is to be used include a case where an instruction to use the image reading section 110 is received via a display (not illustrated) and a case where an instruction to capture an image using the imaging unit 220 is received.

[Transport Section 140]

As illustrated in FIGS. 4A and 4B, the transport section 140 is disposed on one side in the apparatus width direction with respect to the placement portion 120.

The transport section 140 includes a plurality of transport rollers 144 that transport the document G along a transport path 142 in a U-shape that is open on the side of the placement portion 120 as seen in the apparatus depth direction, and a covering portion 146 that covers the plurality of transport rollers 144.

The covering portion 146 is formed from a resin material colored in black, and includes a top plate 148 that covers the transport rollers 144 from above, a side plate 150 that covers the transport rollers 144 from one side in the apparatus width direction, and a side plate 152 that covers the transport rollers 144 from the other side (side of the placement portion 120) in the apparatus width direction.

An opening 152a and an opening 152b that extend in the apparatus depth direction are formed in the side plate 152. The opening 152a and the opening 152b are arranged side by side in the up-down direction. The opening 152a is positioned above the opening 152b. The opening 152a is an example of the reception port.

With this configuration, the transport section 140 receives the document G placed on the placement surface 122 from the opening 152a, and transports the document G along the transport path 142.

The opening 152a and the placement portion 120 form an entrance portion 130 that serves as an entrance for the document G transported to the reading section 156 which reads an image formed on the document G.

[Reading Section 156 and Ejection Section 158]

As illustrated in FIGS. 4A and 4B, the reading section 156 is disposed so as to face the transport path 142 in order to read an image on the document G transported along the transport path 142 by the transport section 140.

The ejection section 158 is in a plate shape with the plate thickness direction corresponding to the apparatus up-down direction, and is disposed below the placement portion 120. The ejection section 158 receives the document G transported by the transport section 140 and ejected from the opening 150b. The ejection section 158 is an example of the second ejection section.

[Exterior Portion 160]

The exterior portion 160 is movable between the blocking position and the exposure position as discussed earlier. At least a part of the exterior portion 160 constitutes the exterior of the apparatus body 10a. The exterior portion 160 is disposed at a height at which the exterior portion 160 is operable by a user operating the apparatus body 10a in a standing posture. In other words, the exterior portion 160 is disposed at a position at a height from 700 [mm] to 1700 [mm] from the floor surface on which the image forming apparatus 10 is placed.

As illustrated in FIGS. 3A and 4B, the exterior portion 160 positioned at the blocking position is disposed so as to block a field of view for the placement surface 122 by covering the placement surface 122 from above. The exterior portion 160 is guided by the guide portions 180 (see FIGS. 5A and 5B) to the blocking position, at which a field of view for the placement surface 122 is blocked, and the exposure position, at which the placement surface 122 is exposed as illustrated in FIGS. 3B and 4B. The exterior portion 160 is moved from the blocking position to the exposure position in this manner.

First, the exterior portion 160 positioned at the blocking position will be described.

Figure 5A:
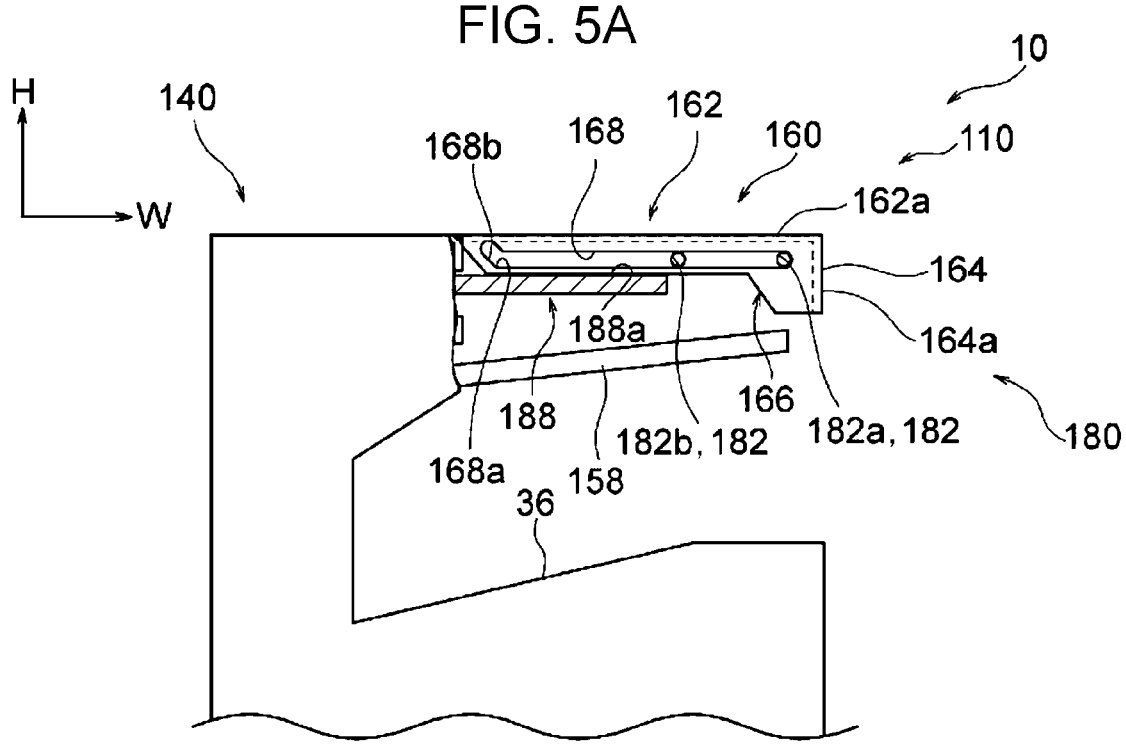
FIGS. 5A and 5B are each a front view illustrating the image reading device of the image forming apparatus according to the exemplary embodiment of the present disclosure.
Figure 5B:
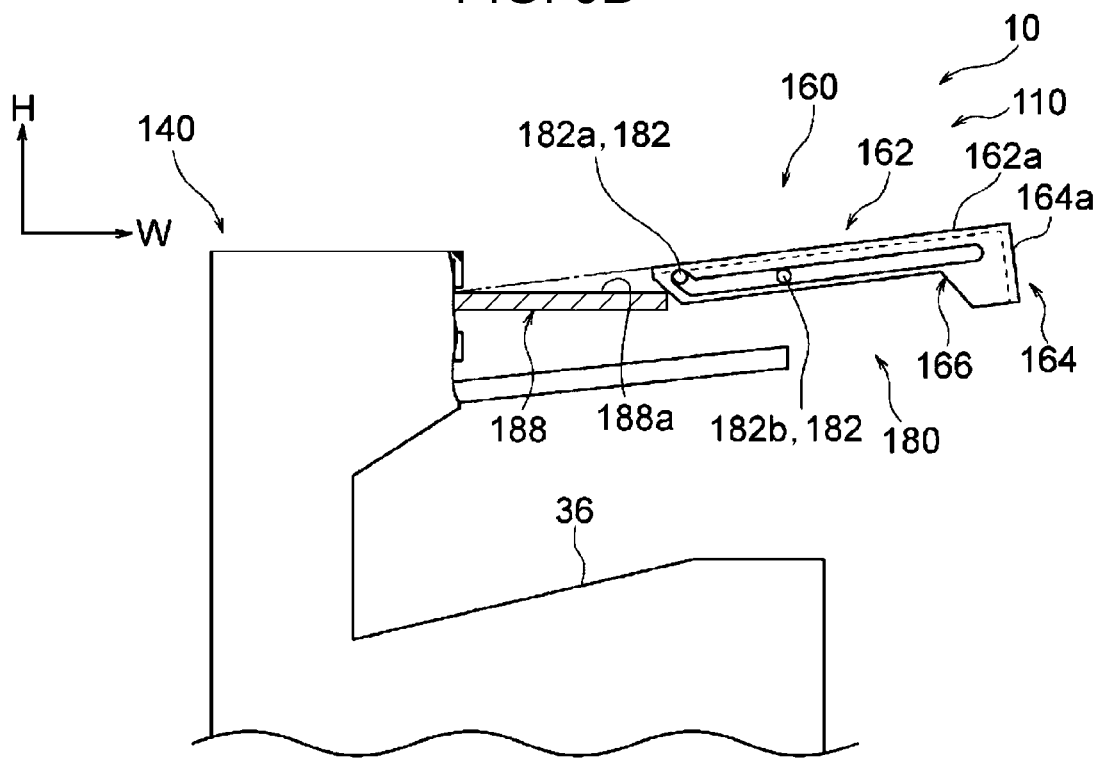

As illustrated in FIG. 4A, the sectional surface of the exterior portion 160 taken along a plane that is orthogonal to the apparatus depth direction is in an L-shape. Specifically, the exterior portion 160 includes the top plate 162, the plate thickness direction of which corresponds to the apparatus up-down direction, and a wall plate 164 coupled to the other end portion of the top plate 162 in the apparatus width direction and the plate thickness direction of which corresponds to the apparatus width direction. As illustrated in FIG. 5A, the exterior portion 160 further includes a pair of side plates 166 coupled to both end portions of the top plate 162 in the apparatus depth direction and both end portions of the wall plate 164 in the apparatus depth direction and the plate thickness direction of which corresponds to the apparatus depth direction.

—Top Plate 162—

As illustrated in FIG. 3A, the top plate 162 is in a rectangular shape as seen from above, with the length thereof in the apparatus width direction and the length thereof in the apparatus depth direction substantially equal to each other. The top surface 162a, which faces upward, of the top plate 162 is in a planar shape with no hole formed therein, and is disposed along the horizontal direction. As illustrated in FIG. 4A, the top plate 162 covers the placement portion 120 from above, and is arranged side by side with the top plate 148 of the covering portion 146 of the transport section 140 in the apparatus width direction. The top surface 162a of the top plate 162 is disposed in the same plane as an upper surface 148a of the top plate 148.

—Wall Plate 164—

As illustrated in FIG. 3A, the wall plate 164 is in a rectangular shape that extends in the apparatus depth direction as seen in the apparatus width direction. As illustrated in FIG. 4A, the wall plate 164 covers at least a part of the placement portion 120 from the other side in the apparatus width direction, and is arranged side by side with the side plate 11 of the apparatus body 10a which faces the other side in the apparatus width direction. A wall surface 164a of the wall plate 164 that faces the outer side is disposed in the same plane as a side surface 11a of the side plate 11 that faces the outer side. In other words, the exterior portion 160 positioned at the blocking position is disposed without projecting in the apparatus width direction with respect to the apparatus body 10a.

The user moves the exterior portion 160 between the blocking position and the exposure position by holding the wall plate 164. In other words, movement of the exterior portion 160 is achieved by the user holding a portion of the exterior portion 160 other than the top surface 162a.

—Side Plates 166—

As illustrated in FIGS. 3A and 5A, the side plates 166 are partially cut away on one side in the apparatus width direction with respect to a rectangular shape extending in the apparatus width direction as seen in the apparatus depth direction, and partially project downward on the other side in the apparatus width direction. As illustrated in FIG. 4A, the pair of side plates 166 interpose at least a part of the placement portion 120 in the apparatus depth direction.

As illustrated in FIG. 5A, a guide rail 168 in the shape of a slit that extends in the apparatus width direction is formed in the side plates 166. Specifically, a bent portion 168a that is bent and an inclined portion 168b that extends as inclined upward from the bent portion 168a are formed at a portion of the guide rail 168 on one side in the apparatus width direction.

Figure 8A:
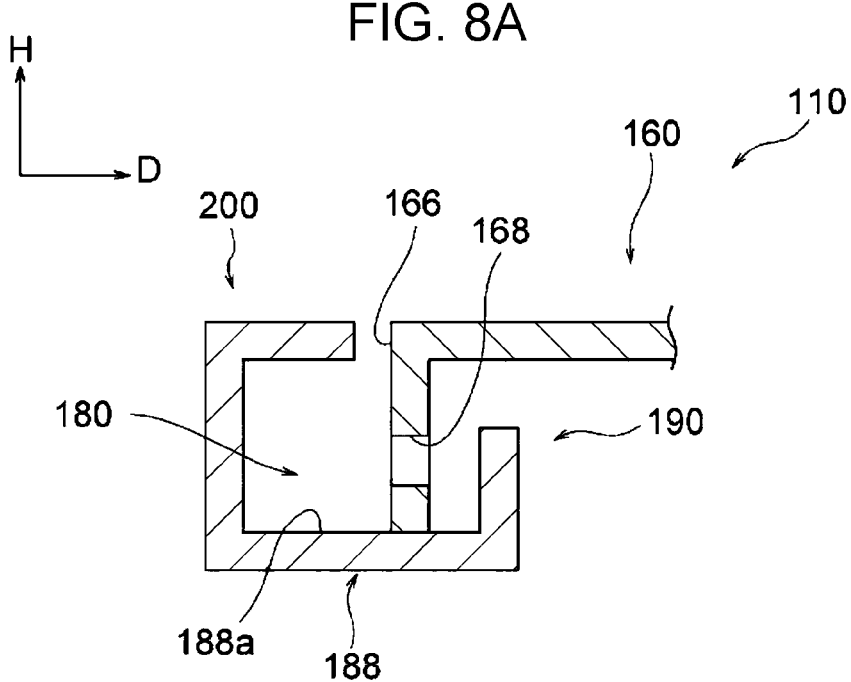
FIGS. 8A and 8B are each a sectional view illustrating a guide portion of the image reading device of the image forming apparatus according to the exemplary embodiment of the present disclosure.
Figure 8B:
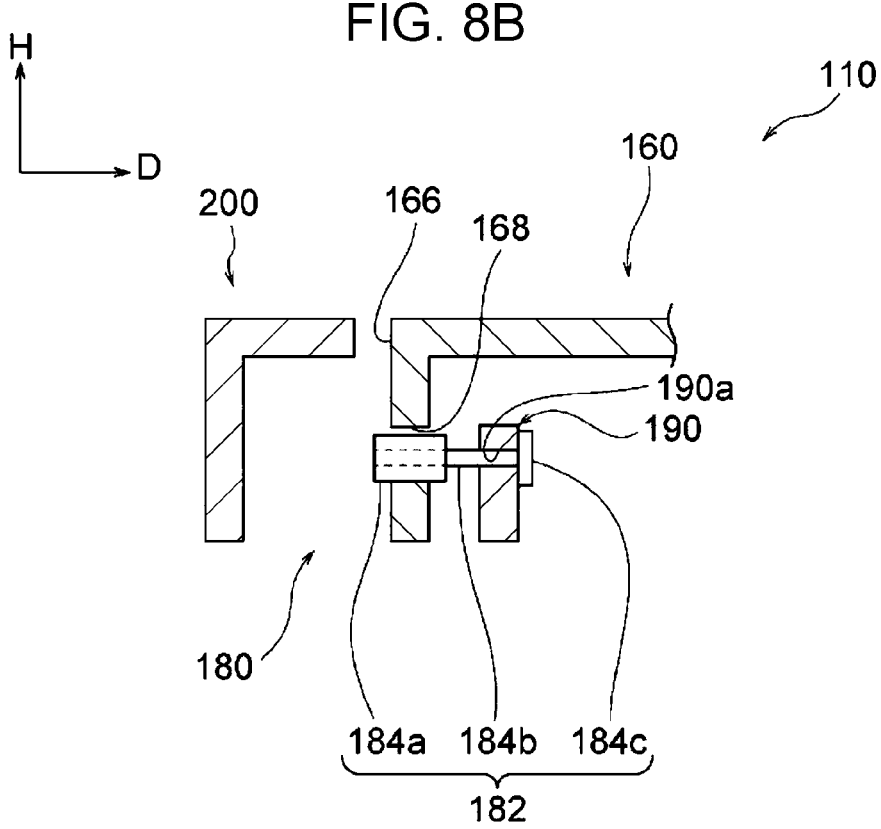

As illustrated in FIGS. 8A and 8B, the image reading device 110 is provided with covering portions 200 in an L-shape that extend in the apparatus width direction in order to block a field of view for the side plates 166.

With this configuration, the exterior portion 160 positioned at the blocking position blocks a field of view for the placement surface 122 as illustrated in FIGS. 3A and 4A.

The phrases "prevent from being seen from the outside", "block a field of view", and "block" as used in the present exemplary embodiment include not only a state in which the inside is not seeable at all from the outside, but also a state in which the inside is not easily seeable at least compared to a state in which the inside is exposed.

It is desirable that the exterior portion 160 should be black in color in the case where it is assumed that the document placed on the exterior portion 160 is imaged by the imaging unit 220.

Next, the exterior portion 160 positioned at the exposure position will be described.

With the exterior portion 160 positioned at the exposure position, as illustrated in FIGS. 3B and 4B, the exterior portion 160 is arranged side by side with the placement portion 120 in the apparatus width direction, and disposed on the opposite side of the placement portion 120 from the transport section 140 in the apparatus width direction. A portion of the exterior portion 160 on the other side in the apparatus width direction projects to the other side in the apparatus width direction with respect to the side plate 11 of the apparatus body 10a. In other words, the exterior portion 160 has been moved with one end of the exterior portion 160 moved beyond the width of the apparatus body 10a.

As illustrated in FIG. 4B, a portion of the top plate 162 of the exterior portion 160 on one side in the apparatus width direction overlaps the recessed portion 124 of the placement portion 120 from above. The top surface 162a of the top plate 162 is disposed in the same plane as the placement surface 122 of the placement portion 120. The top surface 162a of the top plate 162 is inclined at the same angle as the placement surface 122 of the placement portion 120.

With this configuration, the exterior portion 160 positioned at the blocking position is moved to the exposure position to expose the placement surface 122 as illustrated in FIGS. 3B and 4B. A surface for placement of the document G is extended toward the other side in the apparatus width direction by the top surface 162a of the top plate 162. The rear end portion of the document G, the front end portion of which is placed on the placement surface 122, is placed on the top surface 162a of the top plate 162.

[Guide Portions 180]

Next, the guide portions 180 etc. which guide the exterior portion 160 to the blocking position (see FIG. 3A) and the exposure position (see FIG. 3B) will be described.

A pair of guide portions 180 are provided on both sides of the exterior portion 160 in the apparatus depth direction. The pair of guide portions 180 are symmetrical in the apparatus depth direction. One of the guide portions 180 will be described below.

As illustrated in FIG. 5A, the guide portion 180 includes the guide rail 168 formed in the side plate 166 of the exterior portion 160, and two rotary members 182 inserted into the guide rail 168 in the apparatus depth direction. The guide portion 180 further includes a guide plate 188 on which a contact surface 188a is formed. The contact surface 188a contacts the lower end of the side plate 166.

—Rotary Members 182—

As illustrated in FIG. 5A, a pair of rotary members 182 are provided side by side in the apparatus width direction. One of the rotary members 182 (hereinafter "rotary member 182a") is disposed at an end portion of the guide rail 168 on the other side in the apparatus width direction with the exterior portion 160 positioned at the blocking position. The other rotary member 182 (hereinafter "rotary member 182b") is disposed at a portion of the guide rail 168 on the other side with respect to the center portion in the apparatus width direction with the exterior portion 160 positioned at the blocking position. In the following description, symbols a and b at the end of the reference numerals are occasionally omitted in the case where no distinction is made for the rotary members 182 between the rotary member 182a and the rotary member 182b.

As illustrated in FIG. 8B, the rotary member 182 is attached to a frame 190 provided on the inner side of the side plate 166 in the apparatus depth direction. Specifically, the rotary member 182 includes a body portion 184a in a circular column shape inserted into the guide rail 168, and a shaft portion 184b that extends from the body portion 184a toward the frame 190 to be inserted into a through hole 190a formed in the frame 190. The rotary member 182 further includes a retainer 184c attached to an end portion of the shaft portion 184b to prevent the shaft portion 184b from slipping out of the through hole 190a, and a bearing (not illustrated) disposed between the outer peripheral surface of the shaft portion 184b and the inner peripheral surface of the through hole 190a.

The outside diameter of the body portion 184a is smaller than the rail width of the guide rail 168. Consequently, the rotary member 182 inserted into the guide rail 168 is rotatable in the circumferential direction of the body portion 184a.

—Guide Plate 188—

As illustrated in FIG. 8A, the guide plate 188 is in a plate shape with the plate thickness direction corresponding to the apparatus up-down direction. One end of the guide plate 188 in the apparatus depth direction is coupled to the lower end of the covering portion 200. The other end of the guide plate 188 in the apparatus depth direction is coupled to the lower end of the frame 190. As illustrated in FIG. 5A, the guide plate 188 extends from the transport section 140 toward the other side in the apparatus width direction. An end portion of the guide plate 188 on the other side in the apparatus width direction is positioned on one side in the apparatus width direction with respect to the rotary member 182b.

Figure 6A:
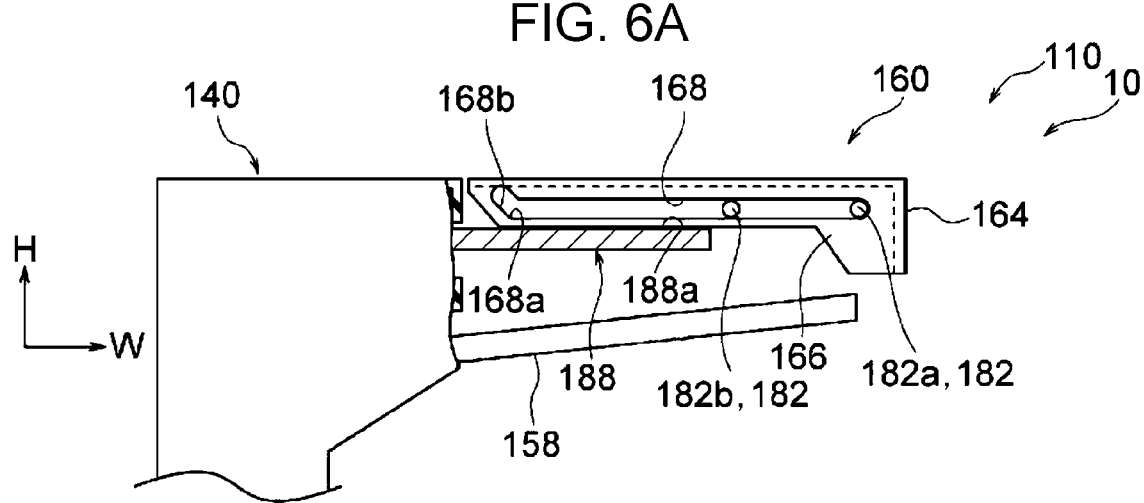
FIGS. 6A, 6B, and 6C are each an enlarged front view illustrating the image reading device of the image forming apparatus according to the exemplary embodiment of the present disclosure.
Figure 6B:
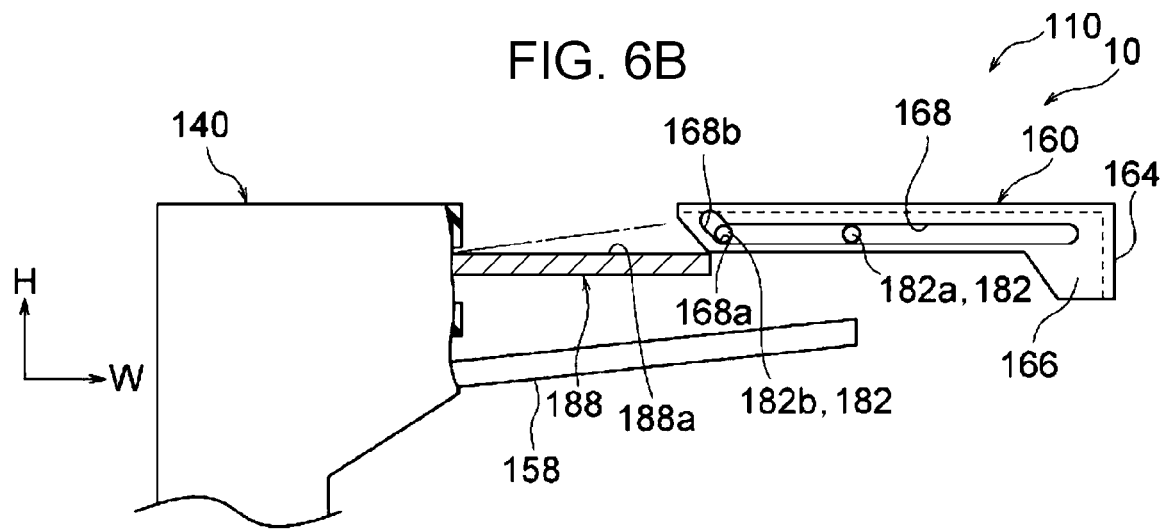

With this configuration, the user moves the exterior portion 160 toward the other side in the apparatus width direction by holding the wall plate 164 of the exterior portion 160 positioned at the blocking position. Then, as illustrated in FIGS. 6A and 6B, the rotary members 182 inserted into the guide rail 168 and the guide plate 188 contacting the lower end of the side plate 166 restrict the guiding direction of the exterior portion 160. The exterior portion 160 is guided toward the other side in the apparatus width direction.

Figure 6C:
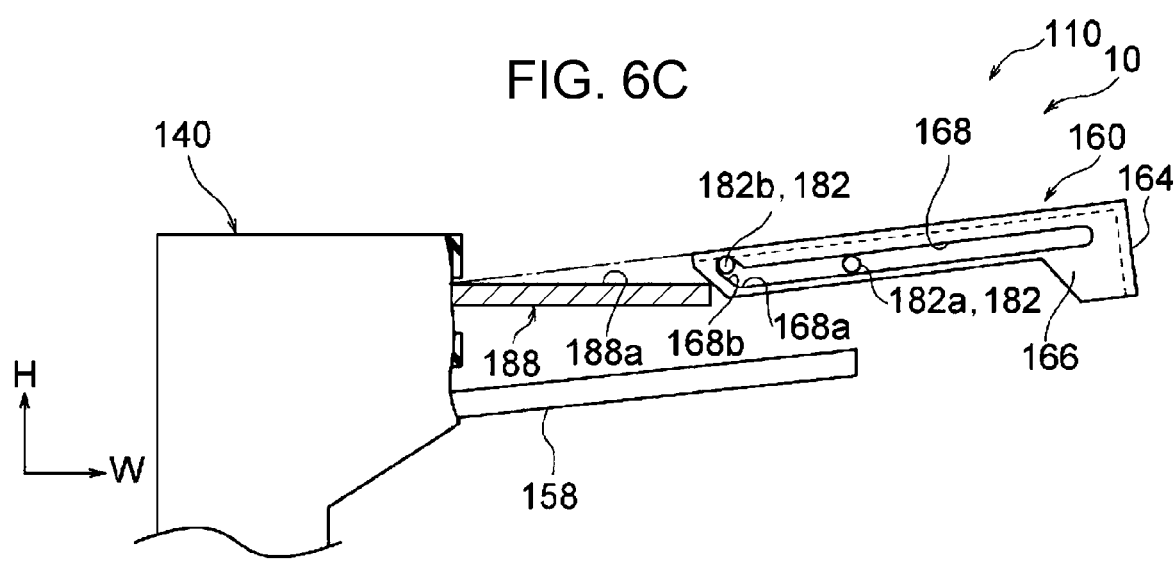

When the bent portion 168a of the guide rail 168 reaches the rotary member 182b, as illustrated in FIG. 6B, the inclined portion 168b of the guide rail 168 receives the rotary member 182b. Consequently, the exterior portion 160 is inclined and guided to the exposure position as illustrated in FIG. 6C. The exterior portion 160 which has been guided to the exposure position is held at the exposure position by a biasing force of a biasing unit (not illustrated).

When the user moves the exterior portion 160 toward one side in the apparatus width direction by holding the wall plate 164 of the exterior portion 160 positioned at the exposure position, on the contrary, the biasing force of the biasing unit is canceled. When the bent portion 168a of the guide rail 168 reaches the rotary member 182b, as illustrated in FIGS. 6B and 6C, the exterior portion 160 extends along the horizontal direction.

As illustrated in FIG. 6A, the exterior portion 160 is guided to one side in the apparatus width direction, and stopped at the blocking position in abutment with a stopper (not illustrated).

As described above, the exterior portion 160 is moved in the horizontal direction between the blocking position and the exposure position. In other words, the exterior portion 160 is slid to be moved between the blocking position and the exposure position.

[Imaging Unit 220]

The imaging unit 220 is a so-called document camera. As illustrated in FIGS. 1 and 3A, the imaging unit 220 includes a support portion 224 that extends upward from a portion of the apparatus body 10a on the center side in the apparatus width direction and on the back side in the apparatus depth direction, and an imaging portion 230.

The support portion 224 includes a support column portion 224a that extends upward from the apparatus body 10a, and an extending portion 224b bent at the upper end of the support column portion 224a to extend toward the front side in the apparatus depth direction. The imaging portion 230 is attached to the extending portion 224b with the imaging direction corresponding to the downward direction.

With this configuration, the imaging unit 220 reads the document G by capturing an image of the document G placed on the top surface 162a of the top plate 162 of the exterior portion 160 positioned at the blocking position, or the document G placed over the top surface 162a of the top plate 162 and the upper surface 148a of the top plate 148 of the covering portion 146.

[Display 250]

The display 250 is a screen that displays an operation on the image forming apparatus 10 and the image reading device 110, and is attached to the support column portion 224a as illustrated in FIGS. 3A and 3B. At least a part of the display 250 overlaps the exterior portion 160 as seen from above.

The display 250 is disposed at a distance from the movement locus of the exterior portion 160. In other words, the display 250 does not interfere with the exterior portion 160 being moved.

(Function of Principal Portion)

Next, the function of the principal portion will be described. The function of the principal portion is described separately for a case where the image reading device 110 reads an image of one or more documents G and a case where the image reading device 110 reads an image of one stationary document G.

[Case where Image of One or More Documents G is Read]

In the case where the image reading device 110 reads an image of one or more documents G, as illustrated in FIG. 3B, the user positions the exterior portion 160 at the exposure position. If the exterior portion 160 is positioned at the blocking position, the user moves the exterior portion 160 toward the other side in the apparatus width direction by holding the wall plate 164 of the exterior portion 160 positioned at the blocking position. Consequently, the exterior portion 160 is guided to the exposure position by the guide portion 180. Consequently, the user positions the exterior portion 160 at the exposure position. As described above, the moving direction of the exterior portion 160 positioned at the blocking position corresponds to the direction of the other side in the apparatus width direction.

Next, the user places the documents G over the placement surface 122 of the placement portion 120 and the top surface 162a of the top plate 162. The user moves the pair of restriction portions 126 into contact with the side edges of the documents G. The user inputs an instruction to read an image to the image reading device 110 through a display screen displayed on the display 250.

When the instruction to read an image is input, the exterior portion 160 positioned at the exposure position is detected by a detection unit (not illustrated). When it is detected that the exterior portion 160 is positioned at the exposure position, the controller 28 (see FIG. 1) derives the size of the documents G from the positions of the pair of restriction portions 126 and detection signals from the detection portions 128a and 128b illustrated in FIG. 4B.

In the case where the detection portions 128a and 128b emit infrared light toward the documents G, it is necessary that at least a portion of the top surface 162a of the top plate 162 of the exterior portion 160 to be irradiated with the light emitted from the detection portion 128b should be made of a transparent material that transmits the light from the detection portion 128b. Specifically, at least a portion to be irradiated with the light emitted from the detection portion 128b with the exterior portion 160 positioned at the exposure position in the case where the exterior portion 160 is slid (guided) in the apparatus width direction should be made of a transparent material.

When the size of the documents G is derived, the transport section 140 which is controlled by the controller 28 transports the documents G, one at a time, along the transport path 142, and the reading section 156 reads an image formed on the documents G being transported. The transport section 140 transports the documents G, from which an image has been read, from one side toward the other side in the apparatus width direction to eject the documents G to the ejection section 158. As described above, the ejecting direction of the documents G, from which an image has been read, corresponds to the direction of the other side in the apparatus width direction.

The image forming section 12 illustrated in FIG. 1 forms toner images on the basis of the image read by the reading section 156, and the toner images are transferred to the recording medium P being transported. The recording medium P, on which the toner images have been transferred, is ejected to the ejection section 36 which is located outside the apparatus body 10a. As discussed earlier, the ejecting direction of the recording medium P, on which an image has been formed, corresponds to the direction of the other side in the apparatus width direction.

[Case where Image of One Stationary Document G is Read]

In the case where the image reading device 110 reads an image of one stationary document G, as illustrated in FIG. 3A, the user positions the exterior portion 160 at the blocking position. That is, in the case where the exterior portion 160 is positioned at the blocking position, the user maintains such a state. If the exterior portion 160 is positioned at the exposure position, on the other hand, the user moves the exterior portion 160 toward one side in the apparatus width direction by holding the wall plate 164 of the exterior portion 160 positioned at the exposure position. Consequently, the exterior portion 160 is guided to the blocking position by the guide portion 180. Consequently, the user positions the exterior portion 160 at the blocking position.

Next, the user places the document G on the top surface 162a of the top plate 162 or over the top surface 162a of the top plate 162 and the upper surface 148a of the top plate 148 of the covering portion 146. In the present exemplary embodiment, a white document G is used. The user inputs an instruction to read an image to the image reading device 110 through a display screen displayed on the display 250.

When the instruction to read an image is input, the exterior portion 160 positioned at the blocking position is detected by a detection unit (not illustrated). When it is detected that the exterior portion 160 is positioned at the blocking position, the imaging unit 220 which is controlled by the controller 28 (see FIG. 1) reads the document G by capturing an image of the document G.

The image forming section 12 illustrated in FIG. 1 forms toner images on the basis of the image read by the imaging unit 220, and the toner images are transferred to the recording medium P being transported. The recording medium P, on which the toner images have been transferred, is ejected to the ejection section 36 which is located outside the apparatus body 10a.

(Conclusion)

In the image forming apparatus 10, as described above, the ejecting direction of the recording medium P on which an image is formed and the ejecting direction of the document G from which an image is read are the same as the moving direction of the exterior portion 160 positioned at the blocking position.

In the image forming apparatus 10, in addition, the reading section 156 is placed over the placement surface 122, which constitutes the entrance portion 130, and the top surface 162a of the exterior portion 160 positioned at the exposure position, the top surface 162a having been exposed before the exterior portion 160 was moved to the exposure position. The document G to be read by the reading section 156 is placed over the placement surface 122 and the top surface 162a of the exterior portion 160 in this manner.

In the image forming apparatus 10, in addition, the exterior portion 160 is moved by the user holding the wall plate 164, rather than the top surface 162a, of the exterior portion 160.

In the image forming apparatus 10, in addition, the top surface 162a of the exterior portion 160 includes no hole for operating the exterior portion 160.

In the image forming apparatus 10, in addition, the imaging unit 220 is disposed above the exterior portion 160 to read an image of the document G, which is an example of the subject, placed on the top surface 162a of the exterior portion 160 positioned at the blocking position. In other words, an image of the document G placed on the top surface 162a is read by the imaging unit 220.

In the image forming apparatus 10, in addition, the exterior portion 160 is slid to be moved from the blocking position to the exposure position.

In the image forming apparatus 10, in addition, the exterior portion 160 is moved from the blocking position to the exposure position so that one end of the exterior portion 160 is moved beyond the width of the apparatus body 10a. In other words, the exterior portion 160 is moved with one end of the exterior portion 160 moved beyond the width of the apparatus body 10a at the time before the exterior portion 160 is slid to be moved.

In the image forming apparatus 10, in addition, the display 250 is disposed at a distance from the movement locus of the exterior portion 160. Consequently, the exterior portion 160 is moved without interfering with the display 250.

In the image forming apparatus 10, in addition, the exterior portion 160 and the display 250 at least partially overlap each other in the apparatus depth direction when seen from above. Consequently, the display 250 is disposed on the front side of the exterior portion 160 in the apparatus depth direction compared to the case where the display 250 is disposed on the back side in the apparatus depth direction.

In the image forming apparatus 10, in addition, the exterior portion 160 positioned at the blocking position blocks a field of view for the entrance portion 130 including the placement surface 122. In other words, the entrance portion 130 is not seen from the user because of the presence of the exterior portion 160. In other words, further, the entrance portion 130 is not likely to be seen from the user.

In the image forming apparatus 10, in addition, the top surface 162a of the exterior portion 160 is a flat surface.

In the image forming apparatus 10, in addition, the exterior portion 160 is disposed at a height at which the exterior portion 160 is operable by a user operating the apparatus body 10a in a standing posture. In other words, the exterior portion 160 is operated to be moved by the user in a standing posture.

In the image forming apparatus 10, in addition, the guide portions 180 allow the exterior portion 160 to be guided and moved in the horizontal direction.

In the image forming apparatus 10, in addition, the rotary members 182 inserted into the guide rail 168 are rotatable in the circumferential direction of the rotary members 182.

In the image forming apparatus 10, in addition, a part of the document G placed on the placement surface 122 is placed on the top surface 162a of the exterior portion 160 with the exterior portion 160 positioned at the exposure position. Consequently, the document G is placed on a large area compared to the case where the document G is placed only on the placement surface 122.

In the image forming apparatus 10, in addition, the top surface 162a of the exterior portion 160 is inclined such that a portion of the top surface 162a on one side in the horizontal direction is lower than a portion thereof on the other side with the exterior portion 160 positioned at the exposure position.

In the image forming apparatus 10, in addition, the recessed portion 124 which is recessed by the thickness of the exterior portion 160 is formed at a portion of the placement portion 120 overlapped by the exterior portion 160. Consequently, the step between the placement surface 122 and the top surface 162a is reduced compared to the case where no recessed portion is formed.

While a specific exemplary embodiment of the present disclosure has been described in detail above, the present disclosure is not limited to such an exemplary embodiment. It is apparent to a person skilled in the art that a variety of other exemplary embodiments of the present disclosure may fall within the scope of the present disclosure. For example, while the image forming apparatus 10 is of an electrophotography type in the exemplary embodiment of the present disclosure, an inkjet image forming apparatus may also be used, for example.

While the exterior portion 160 is moved in the horizontal direction in the exemplary embodiment, the exterior portion 160 may be rotated to be moved etc.

While the exterior portion 160 is moved by the user holding the wall plate 164 of the exterior portion 160 in the exemplary embodiment, the exterior portion 160 may be moved by the user holding the top surface 162a.

While the exterior portion 160 positioned at the blocking position blocks a field of view for the entrance portion 130 including the placement surface 122 in the exemplary embodiment, it is only necessary that the entrance portion 130 should not be seen from the user because of the presence of the exterior portion 160.

While the rotary members 182 inserted into the guide rail 168 are rotatable in the exemplary embodiment, the rotary members 182 may not be rotatable.

While the top surface 162a of the exterior portion 160 positioned at the exposure position is inclined with respect to the horizontal direction in the exemplary embodiment, the top surface 162a may extend along the horizontal direction.

While the recessed portion 124 which is recessed by the thickness of the exterior portion 160 is formed at a portion of the placement portion 120 to be overlapped by the exterior portion 160 in the exemplary embodiment, the recessed portion may not be formed.

While the guide rail 168 is formed in the exterior portion 160 and the rotary members 182 are attached to the apparatus body 10a in the exemplary embodiment, the guide rail may be formed in the apparatus body and the rotary members may be attached to the exterior portion.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
an image forming section that forms an image on a document;
a first ejection section that ejects the document on which the image has been formed by the image forming section, wherein the first ejection section comprises an inclined surface;
an exterior portion which is movable and at least a part of which constitutes an exterior of the apparatus, wherein the exterior portion comprises a top surface;
an entrance portion that is exposed by movement of the exterior portion and that constitutes an entrance for the document to be transported to an image reading section that reads the image formed on the document;
the image reading section that reads the image formed on the document transported after the entrance portion is exposed, wherein the image reading section comprises a camera; and
a second ejection section that ejects the document which has been read by the image reading section,
wherein an ejecting direction of the first ejection section, an ejecting direction of the second ejection section, and a moving direction of the exterior portion coincide with each other,
wherein the entrance portion and the exterior portion are disposed adjacent to each other so as to form one plane after the exterior portion is moved,
wherein the entrance portion comprises a placement portion in a plate shape and on which a placement surface for placement of the document is formed,
wherein the placement surface and the exterior portion are configured to support the document.

2. The image forming apparatus according to claim 1, wherein the image reading section reads an image of a document placed on the entrance portion and a portion of the exterior portion exposed before the movement of the exterior portion.

3. The image forming apparatus according to claim 2, wherein the exterior portion is slid to be moved to expose the entrance portion.

4. The image forming apparatus according to claim 3, wherein the exterior portion is slid such that the exterior portion is moved beyond a width of the apparatus at a time before the exterior portion is slid.

5. The image forming apparatus according to claim 1, wherein the exterior portion is moved by a user holding a portion of the exterior portion other than the top surface of the exterior portion.

6. The image forming apparatus according to claim 5, wherein the exterior portion is slid to be moved to expose the entrance portion.

7. The image forming apparatus according to claim 6, wherein the exterior portion is slid such that the exterior portion is moved beyond a width of the apparatus at a time before the exterior portion is slid.

8. The image forming apparatus according to claim 1, wherein the top surface of the exterior portion includes no hole for performing an operation to move the exterior portion.

9. The image forming apparatus according to claim 8, wherein the camera that reads a subject placed on top of the exterior portion is provided above the exterior portion.

10. The image forming apparatus according to claim 1, wherein a display is provided above the exterior portion.

11. The image forming apparatus according to claim 10, wherein the exterior portion is moved so as not to contact the display.

12. The image forming apparatus according to claim 11, wherein the exterior portion and the display at least partially overlap each other when the exterior portion is seen from above.

13. The image forming apparatus according to claim 1, wherein the entrance portion is positioned below the exterior portion, and not seeable from a user because of presence of the exterior portion if the exterior portion is not moved.

14. The image forming apparatus according to claim 1, wherein the exterior portion is positioned above the image forming section, and an upper part of the exterior portion includes a flat surface.

15. The image forming apparatus according to claim 1, wherein the exterior portion is disposed at a height at which the exterior portion is operable by a user operating the apparatus in a standing posture.

16. The image forming apparatus according to claim 1, further comprising:
a guide portion that guides the exterior portion in a horizontal direction.

17. The image forming apparatus according to claim 16, wherein the guide portion includes a guide rail provided in one of the exterior portion and an apparatus body to extend in the horizontal direction, and a rotary member provided on the other of the exterior portion and the apparatus body to be inserted into the guide rail, the rotary member being rotatable in a circumferential direction.

18. The image forming apparatus according to claim 16, wherein the entrance portion includes a reception port that receives the document to be transported toward the image reading section,
a transport section that transports the document is disposed on one side in the horizontal direction with respect to the placement portion,
the exterior portion is arranged side by side with the placement portion in the horizontal direction with at least a part of the exterior portion projecting to the other side in the horizontal direction with respect to the placement portion with the placement surface exposed, and
a part of the document placed on the placement surface is placed on the top surface of the exterior portion that faces upward with the exterior portion exposing the placement surface.

19. The image forming apparatus according to claim 18, wherein the top surface of the exterior portion is inclined such that a portion of the top surface on one side in the horizontal direction is lower than a portion of the top surface on the other side with the exterior portion exposing the placement surface.

20. The image forming apparatus according to claim 19, wherein a portion of the exterior portion on one side in the horizontal direction overlaps from above a portion of the placement portion on the other side in the horizontal direction with the exterior portion exposing the placement surface, and a recessed portion recessed by a thickness of the exterior portion is formed at the portion of the placement portion to be overlapped by the exterior portion.

* * * * *